United States Patent [19]
Hobgood et al.

[11] 3,847,552
[45] Nov. 12, 1974

[54] ENVIRONMENTAL MONITORING DEVICE AND METHOD

[75] Inventors: Leonard Douglas Hobgood, Durham; Jerry Alan Lorenzen, Raleigh, both of N.C.

[73] Assignee: International Business Machines Corporation, Armonk, N.Y.

[22] Filed: Nov. 23, 1973

[21] Appl. No.: 418,321

[52] U.S. Cl. .............................. 23/232 R, 23/254 R
[51] Int. Cl. .......................................... G01n 21/12
[58] Field of Search ........... 23/232, 255, 254; 73/23

[56] References Cited
UNITED STATES PATENTS

| | | | |
|---|---|---|---|
| 1,414,194 | 4/1922 | Levy | 23/232 X |
| 2,487,077 | 11/1949 | Shephard | 23/232 R |
| 3,545,930 | 12/1970 | Walker et al. | 23/232 R |
| 3,698,871 | 10/1972 | Brennan | 23/232 X |

Primary Examiner—R. E. Serwin
Attorney, Agent, or Firm—Edward H. Duffield

[57] ABSTRACT

A method of simultaneously measuring the quantitative presence of a plurality of atmospheric pollutants and apparatus for performing the measurement is disclosed. Specific dry reagents which react with particular pollutants to be measured are exposed in a staged array according to their reactivity to a known volume of ambient air at a location to be measured. The reaction products are later analyzed to obtain a quantitative measure of the pollutants present in the sample.

4 Claims, 2 Drawing Figures

ENVIRONMENTAL MONITORING DEVICE AND METHOD

BACKGROUND OF THE INVENTION

1. Field of the Invention

This invention relates to pollution level measurement devices and methods in general, and in particular to gaseous pollutant measurements by the use of dry reactive indicators and analysis of the reactive products.

2. Prior Art

Due to increasing emphasis on the effects of atmospheric pollutants, both on the environment itself and on manmade objects and devices which must endure in the environment, a variety of methods and devices have been developed for qualitative and quantitative analysis of the various constituents present at a given location in the atmosphere. In general, gaseous and particulate levels in the atmosphere have been of primary concern. Sophisticated equipment for determining the levels of gaseous pollutants has been developed and methods and techniques for each specific type of pollutant are continually being improved and expanded upon.

Typically, however, determination of gas pollution levels has required highly trained technical personnel with the facilities of a full "wet" gas laboratory or delicate and sensitive instruments to determine the qualitative and quantitative presence of various pollutive gases at a given site. The complexity of the equipment and the degree of training and time required in order to make these measurements unfortunately restricts the use of such expertise. The cost and difficulty involved limit such techniques to only those most important instances where sufficient funding, time, and equipment can be brought to bear on a given pollution problem. The specific types of devices utilized run the gammut of the full wet lab analytical set-up, familiar to most chemists, down to simple colorimetric or visual observation apparatus and technique. Devices for particulate measurement generally involve either sophisticated particle trapping and counting mechanisms, or, at the low end of the economic scales, a series of filters of various sizes which can collect particles from a known sample of air for later gravimetric and chemical analysis. In all of this development activity, however, the need for inexpensive, simple, and precise methods and apparatus has become increasingly clear. Specific detection devices for certain gases have been developed and reported. For example, atmospheric hydrogen sulfide, a corrosive and dangerous gas at many levels of concentration, can be detected and measured by the use of the well-known methylene blue reaction long familiar to chemists. In this method, a trapping solution of methylene blue is utilized and careful exposure and measurement techniques followed by careful analysis are required to determine the amount and presence of hydrogen sulfide. The method has been improved by stabilizing the trapping solution with cadmium hydroxide used as an antioxidant, but the loss of collected sulfide was not completely prevented. Spectrophotometric methods have been developed and gas chromatographic and flame photometric detector methods have also been utilized. It is obvious in these developments that either highly sophisticated and sensitive equipment and trained personnel are necessary at the location to be measured, or that cumbersome equipment and precisely defined samples must be taken frequently for analysis at a laboratory later. As a possible alternative, the use of wet chemical solutions is, in general, technically relegated to trained personnel only.

Paper impregnated with various reagent salts has also been used to trap hydrogen sulfide, with salts of lead, mercury, and silver being used extensively. It has also been shown that hydrogen sulfide trapped on silver nitrate impregnated paper can be accurately analyzed using a spectro fluorometer as is discussed, along with all the foregoing mentioned techniques, in a paper by Natusch et al. published in the journal, "Analytical Chemistry," Volume 44, No. 12, October, 1972 at page 2067 and following. Metallic silver filters have also been utilized for determining exposure to hydrogen sulfide as reported by Falgout et al. in Journal of the Air Pollution Control Association, January, 1968, Volume 18, No. 1, pages 15-20.

Other atmospheric gases such as oxides of sulfur, chlorine and various chlorides and atmospheric sulfur vapor are all of significance, particularly with regard to the exposure of electronic and electromechanical devices and machines which must endure and operate correctly for an extended period in the environment in which these constituents are present. It is, in fact, crucial when sophisticated electronic data processing machines are to be installed, that an accurate determination of the installation site severity as to pollution levels be obtained so that decisions relative to the placement of these machines or the modification of the environment prior to the placing of the machines can be made. The expense of modifying the environment is often quite large and the expense involved if measurements are not made and the proper decisions are not made is even greater because the machines will suffer failure due to corrosion from atmospheric gases and particulates of the various types of pollutants mentioned.

The prior art indicated above has provided accurate, but highly cumbersome, expensive and time consuming methods for measuring the severity of atmospheric pollution levels, both gaseous and particulate, for all of the various types of corrosive and harmful agents that are important. What has not, heretofore, been provided is a means and method for a routine determination of atmospheric severity on the site by an untrained, perhaps non-technical person. Similarly, while inexpensive indicators such as treated paper tapes etc., have been provided, no inexpensive technique or methods for quantitative analysis have been developed previously which can be utilized daily or weekly by hundreds of individuals located in many parts of the world. The expense of instrumentation and of highly trained personnel and/or the extensive and expensive analytical time and professional labor that is required to analyze samples that are taken on the simple indicators by untrained personnel have now been eliminated.

In addition, while various types of dry indicators have been developed, the equipment must be small and easily transportable. No sophisticated chemical technique or delicate instrumentation can be practically applied within economic expenditure levels that can be justified. Precision also is of prime importance and the various simple and routine measurements such as chemical indicator tapes are far too gross in their indication to be truly useful. Small errors can be tolerated in measurements due to safety factors in design, but the cost to the purchaser of expensive equipment or to the manufacturer who must later repair or modify expensive equipment cannot long be stood. As a further requirement, measurements taken at different sites must be precise relative to one another and to the standard.

A review of available methods and instruments indicates that the kind of device set forth by the above criteria is not now available. All the techniques and instruments that are currently in use suffer from one or more of the foregoing difficulties or are entirely too cumbersome and expensive to be utilized in a commercial environment by untrained personnel.

OBJECTS OF THE INVENTION

In light of the foregoing difficulties and deficiencies in the known prior art devices and techniques, it is an object of this invention to provide an improved technique for measuring a plurality of atmospheric gaseous and particulate pollutants quantitatively and simultaneously.

It is a further object of this invention to provide simple, inexpensive and accurate measurement devices of an improved type which can be utilized properly by untrained personnel to collect accurately and simply the pollutants for later analysis by more trained personnel.

It is still a further object of this invention to provide small, easily transportable, and improved measuring devices for quantitatively measuring a plurality of pollutants at a remote site of an improved and inexpensive form.

SUMMARY OF THE INVENTION

The foregoing and other objects of the invention are met by utilizing a cartridge containing a plurality of dry reagent carriers in a staged array depending on their reactivity with given pollutants to be measured. The cartridge is sealed from the air and transported to the measurement area where it is exposed and resealed and mailed back to the laboratory for analysis. The chemical reaction products carried on the various strata of the cartridge can be quickly and easily analyzed by untrained personnel with the proper equipment. The provision of mailable, non-breakable, simple and accurate indicators, together with an improved analytical technique, enable the invention to be utilized by those who are not trained and to obtain accurate and reproducible results at a minimum cost.

SPECIFICATION

Figure 1:
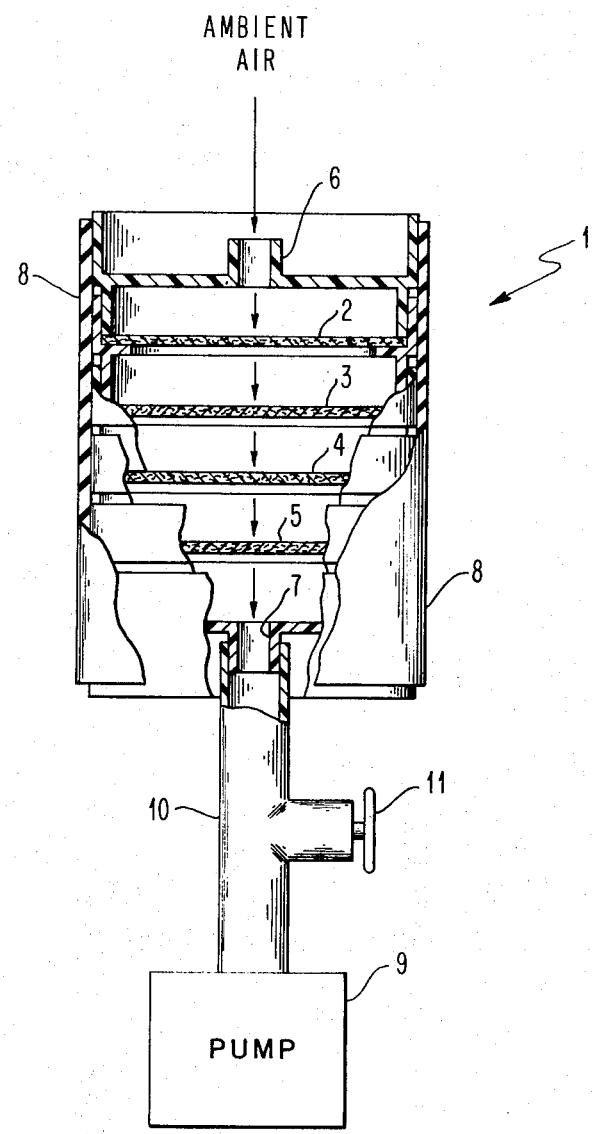
FIG. 1 illustrates in cross-section a schematic representation of one example of a measuring apparatus according to the invention.

FIG. 1 illustrates an environmental monitoring cartridge device in schematic form to show the placement of the elements within it relative to one another and to the direction of flow of air being sampled. The device consists of a tubular holder 1 and a plurality of filter paper disks 2 through 5, some of which as will appear below, are treated with chemical reagents and dried. The cylinder 1 has an inlet opening 6 which is closeable by a plug, not shown for the sake of clarity, which can be used for sealing or resealing after opening and an outlet orifice 7 similarly outfitted with a plug for sealing or resealing and not shown. The cylinder is covered with opaque material 8 on all sides to prohibit the entrance of light and particularly ultra-violet rays and to the active chemical supporting filters or carriers 2 through 5. A pump 9 is attached at will when the opening 7 has been unplugged for the purpose of drawing in a sample of ambient air through opening 6 when it is unplugged.

Pump 9 may be outfitted with an inlet 10 which can attach to the outlet 7 of cylinder 1. The inlet 10 may be provided with an orifice or a flow restrictor 11 for accurately metering the flow rate of air drawn by the pump through the cartridge assembly. A known sample of air may thus be obtained by operating the pump at a given rate with a given flow restrictor in the inlet 10 so that the total sample of as many liters of air as desired may be taken and passed through the reactive elements in cartridge 1.

Figure 2:
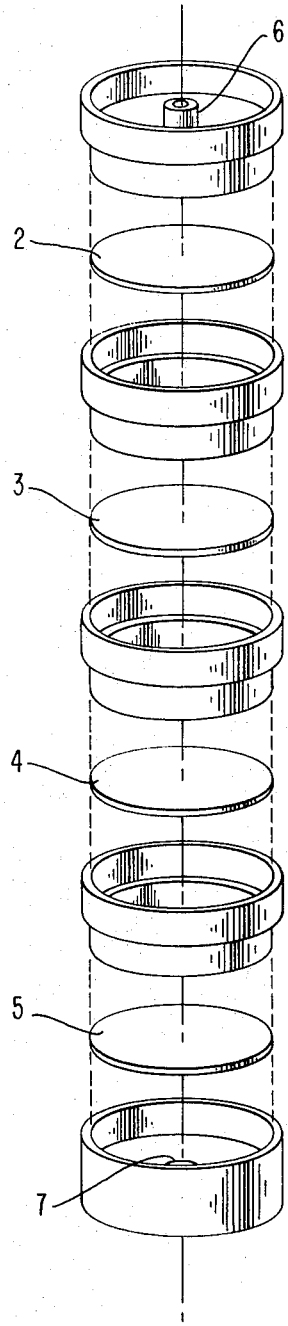
FIG. 2 is an exploded view of one embodiment of the invention in which particulates, chlorine gas pollutants, atmospheric sulfur pollutants, and oxides of sulfur are measured.

Turning now to FIG. 2, an exploded view of one embodiment of the invention which has proved to meet the foregoing requirements is illustrated. Millipore Field Monitors are illustrated in FIG. 2. These are commercially available devices, available from the Millipore Company and from chemical supply houses under part no. M000037A0. The field monitors consist of a first segment having an inlet opening sealable by a plug, a center ring with a ledge for supporting a standard 37 millimeter diameter filter, and an outlet end having a similar pluggable orifice for connection to a pump. The center rings, Millipore part no. M000037R0 are used as spacers between filters 2 through 5 as shown. As previously stated, these devices hold 37 millimeter diameter standard filters which have an effective filtration area in place of 9.0 square centimeters. Vinyl tape of dark color may be wrapped around the cartridge assembly to hold the assembly together and to prevent the admission of light so that it serves as a light preventive covering or opaque covering 8. Other suitable means of preventing the entry of light would be to make a filter supporting members and the inlet and outlet members of opaque material or to provide a sleeve or canister to enclose the cartridge 1.

Filters 2 through 5 must be arranged in a specific order as will appear below depending on the pollutants to be detected and the reactivity of the reagents utilized. Filter 2 is a standard Whatman No. 41 cellulose fiber paper. Its purpose is to collect particulate matter and to prevent the contamination of following filters with the particles of airborne material. It has the advantage of being low in cost, high in mechanical strength and low in background level as to the pollutants of interest and has a relatively low flow resistance of approximately 1.5 inches of water at a flow rate of 2 liters per minute. It is approximately a 180 microns thick and has a specified void size of 4+ microns. Filter 2 is, when used, the first filter element in the cartridge 1. Filter 2 may be omitted from the array under some office work-place conditions where the suspended particulates are primarily fiber or earthy substances. The remaining filter elements 3 through 5 may be changed or varied depending on the number and type of pollutants to be measured. While four filters are shown in the example, it is because only four are required in the embodiment to be discussed. It will be obvious that additional or fewer filters would be used as desired, provided the proper rules as to order of the filters in the array are followed. The proper order and rules will appear below in a sequence designed to determine the presence and quantity of several pollutants.

While many gaseous pollutants are harmful and are corrosive insofar as exposure of business machines is concerned in ambient environments, items of particular concern are the chlorine and chlorides, active sulfur and sulfides. Sulfur oxides are also of primary importance. In the embodiment shown in FIG. 2, filter no. 2 is the aforementioned particulate filter. Filter no. 3 is the first chemical reagent filter and reacts with chlorine gas. Filter no. 3 is prepared by impregnating standard Whatman No. 41 filter paper with ortho-tolidine (4, 4'-diamino-2, 2'-dimethyl-biphenyl). The standard 37 millimeter diameter filter paper is prepared by using the following procedure: Whatman No. 41 paper is immersed in a solution of 2.5 percent ortho-tolidine in acetone for a minimum of 10 seconds. The immersed filters are then removed from the solution and placed on large sheets of Whatman No. 41 paper to absorb any excess solution. The individual filters are then placed in a clean dry oven at 50° centigrade for 10 minutes, following which they are removed and stored in a dry, air-tight, dark location. This process insures that sufficient ortho-tolidine will be impregnated onto the filter paper to react with all chlorine gas without allowing any of it to pass further through the staged array of filters. The range of chlorine containing concentrations through which this indicating filter is useful, based primarily on the amount of ortho-tolidine present on its surface and free for reaction, is approximately 0.5 to $25 \mu g/m^3$. This range is much broader than the expected concentrations of chlorine in any ordinary environments and assures that no saturation of the filter will occur and that all chlorine entering the cartridge will be reacted at this stage. The reaction of chlorine gas containing pollutants results in the production of a stable ortho-tolidine complex which is blue in color. Other oxidizing gases such as $NO_2$ or $O_3$ may also react with ortho-tolidine and produce other color complexes. However, the analytical technique to be utilized discriminates between chlorine containing reactive products and other types of reactive products as will appear below.

Filter No. 4 is used to collect any reactive sulfur in the sample. Sulfur will pass through filter No. 3 without reacting and will react with the reagent on filter No. 4. Filter 4 is impregnated with silver nitrate on Whatman No. 41 paper and collects all reactive sulfur present in the sample. This filter is prepared as follows: The filter paper is immersed in a 0.01 molar solution of nitric acid containing 2 percent silver nitrate and 20 percent methyl alcohol for 30 seconds. The impregnated filters are then removed and placed on large filter paper to absorb the excess solution. The filters are placed in a clean dry oven at 100° centigrade for 15 minutes and are then removed and stored in air-tight and light-tight containers. As with the preparation of filter No. 3, these filters are impregnated with sufficient reagent, in this case silver nitrate, to assure complete reaction with all sulfur present in the sample. This filter will react with sulfur in a gaseous form such as $S_8$, hydrogen sulfide and a variety of mercaptans, but not with sulfur dioxide.

Filter No. 5 is the sulfur dioxide filter and is prepared as follows.

Filter No. 5 is Whatman No. 41 filter paper which is treated with nickel hydroxide to react with and retain any sulfur dioxide which passes through the first three filters. It is prepared as follows: the filter paper is immersed in a solution containing 10 grams of nickel sulphate in 30 milliliters of ammonium hydroxide for 5 minutes. The filters are then removed and placed in an oven at 80° centigrade for 15 minutes. The filters are removed from the oven and immersed in another solution containing 5 percent sodium hydroxide and 2 percent sodium carbonate for 5 minutes. The filters are removed from the second bath and rinsed thoroughly in deionized water for 5 minutes. The filters are then placed on large filter papers to absorb any excess solution and are placed in an oven at 80° centigrade for 20 minutes. They are then removed and stored in an air-tight container. The collection of sulfur dioxide on potassium bicarbonate impregnated filter paper with subsequent analysis has been reported by Brosset in an article in Chemical and Engineering News, Sept. 11, 1972, page 44. We have, however, found that sulfur dioxide can react quickly and quantitatively with nickel hydroxide which is impregnated on paper to form nickel sulfate. The filters change color from a light green to a gray to qualitatively indicate the presence of substantial quantities of $SO_2$. Quantitative determination of the collected sulfur dioxide is accomplished by a measurement technique to be discussed later.

It is important to know that the sulfur dioxide filter reagent No. 5 must be placed after filter No. 4 in the order of contact of the sample with the reagents since the nickel hydroxide reagent present on filter 5 will react with most forms of free sulfur as well. Similarly too, filter No. 5 with the nickel hydroxide reagent must follow filter No. 3 with the ortho-tolidine reagent since chlorine gas or chlorides will react with the more reactive nickel hydroxides as well. As a general rule, each reagent which is reactive with more than one pollutant must be placed lower in the array than any other reagent which is reactive with one or fewer of the same pollutants. Stated alternatively, no reagent substrate can be placed higher in the stack than any substrate which carries a specific reagent for any of the pollutants to which the higher substrate reagent is also sensitive.

Laboratory analysis of the reaction products present on the various filter elements after exposure to a known volume of air drawn through cartridge 1 by pump 9 at a given remote site can be accomplished by many methods as will be readily appreciated by those skilled in chemical analysis. The preferred method of analysis is, however, by the use of energy dispersive X-ray fluorescence spectrometry. The use of such equipment has been previously reported by Birks in a text entitled, "X-Ray Spectrochemical Analysis," Second edition, published by Interscience Corp., 1969, and by Bertin in a text entitled, "Principles and Practice of X-Ray Spectrometric Analysis," Plenum Press, 1970. The general method consists of bombarding a sample with high energy photons from an X-ray source. When a high energy photon strikes an electron and displaces it from one of the inner orbital shells of a given sample atom, an electron from one of the outer orbital shells rearranges itself to replace the inner electron. In order to conserve energy in the process, as will be readily appreciated by chemists and physicists, X-ray radiation characteristic of the particular transition required is emitted by the higher energy outer electrons falling and giving up energy as they arrive at the inner and lower energy shells. The transition energies follow a continuous progression by atomic number and the method is universally applicable to all elements above sodium in atomic number, thus taking in the broad range of possible atmospheric pollutants. The transition energies produce X-rays having specific electron volt potentials when detected by an X-ray detector and thus provide an indisputable signature for each chemical element which is above sodium in this technique. Chlorine, for example, has an alpha line from the K shell electrons at 2.622Kev and another from the K shell electron, the beta line at 2.817Kev. The only interfering atomic structures are Rhodium with an L shell alpha line at 2.696Kev and technetium with a beta L shell line at 2.674Kev, ruthenium with an L beta line at 2.683Kev and polonium, astatine, and radon with very low intensity M shell lines. The presence of these elements as atmospheric pollutants and as reactive products on the ortho-tolidine filter is extremely unlikely except in environments where such elements are produced or handled.

In order to utilize this method for quantitative analysis, one must relate measured X-ray intensities from a sample to known compositions. Chlorine calibration standards can be prepared, for example, by exposing 37 millimeter orthotolidine impregnated filters to known quantities of chlorine gas measured by micro-dilution. Additional standards can be made by uniform deposition of measured quantities of chlorine containing compounds such as sodium chloride or copper chloride. X-ray emission obeys the rules of statistics for random process as will be well known to those in the field, and the precision of energy dispersive X-ray technique measurements can be calculated directly.

As detailed above, when the various reagent carriers or substrates are prepared as shown, they react with virtually all of the pollutants which they are designed to measure, and very close correlation, within statistical variation of the basic process, is possible as shown by the following data taken from actual tests.

An accelerated test atmosphere was designed in which hydrogen sulfide, sulfur dioxide and chlorine were injected into a controlled test chamber in specific amounts while a sample detection device constructed according to the above teachings was present to measure the amount of each gas. Hydrogen sulfide was introduced into the chamber in a calculated concentration of 360 parts per billion, sulfur dioxide at 480 parts per billion, and chlorine at 70 ppb for an accelerated test. A second test, a simulated field environment, contained hydrogen sulfide concentrations at 33 parts per billion, sulfur dioxide at 23 parts per billion, and chlorine at 27 parts per billion.

As noted below in the table of measurements, the accelerated test used concentrations approximately one order of magnitude greater than that which would actually be experienced in the typical industrial environment. During the simulated field environment test shown below, the approximate concentrations fall within the range of those known to exist in certain industrial areas. In the accelerated test, a temperature of 25° centigrade and 80 percent relative humidity was utilized. At this temperature and relative humidity reactions between hydrogen sulfide and any chlorine present in the environment take place to produce free gaseous sulfur which will react with the silver nitrate substrate, which is also sensitive to hydrogen sulfide. In the simulated field environment test run at 27.5° centigrade and 60 percent relative humidity, the reaction between hydrogen sulfide and chlorine occurs. Similarly, in both tests, the higher the relative humidity, the more free chlorine will react with water vapor to form hydrochloric acid which will be trapped on the Whatman No. 41 particulate filter. This will reduce the amount of free chlorine detected on the orthotolidine chlorine detector.

ACCELERATED TESTS

| Test Conditions: | 25° centigrade, relative humidity 80% |
|---|---|
| Constituents: | hydrogen sulfide 360 ppb (calculated) |
| | sulfur dioxide 480 ppb (calculated) |
| | chlorine; 70 ppb (calculated) |
| | NOTE: Standard control and concentration analysis using lead acetate tape sampler measurements for hydrogen sulfide: 350 ppb (control measure). |
| Concentration as measured by the silver nitrate reagent filter of the present invention: (over approximately 4 tests) | 390 to 420 ppb or a numerical average of 410 ppb (measured). |

As noted above, this device measures total reactive sulfur which would include hydrogen sulfide and free sulfur from the reaction between hydrogen sulfide and free chlorine in the environment. In the present case, free sulfur in the test chamber from the $H_2S$-$Cl_2$ reaction was present and affected the measurement made. It should be noted that the lead acetate tape sampler reacts only with hydrogen sulfide. The reading of the eight samples made with the lead acetate tape sampler, which varied between 330 parts per billion and 360 parts per billion, are, and should be, somewhat lower than those detected by the reactive substrate filter of the present invention which also reacts with free sulfur.

The sulfur dioxide concentration measured control was performed by the standard hydrogen peroxide collection and base titration method, well-known to those in the art: the reading thus obtained was 400 parts per billion average over 4 tests.

Concentration as measured by the sulfur dioxide reagent substrate of the present invention: 300 to 350 parts per billion for an average of 330 parts per billion.

It is to be noted from the above accelerated tests that chlorine was introduced into the test chamber at 70 ppb. This causes the aforementioned problem with the reaction of chlorine and water vapor and/or with $H_2S$. The majority of chlorine measured by the present invention was collected on the first Whatman No. 41 filter as HCl. The total chlorine collected ranged from 45 to 83 ppb, with an average of 70 ppb as noted. It should also be noted that while concentrations far in excess of those to be normally measured or experienced by the invention were used, nevertheless they were analyzed and measured fairly closely and correlate generally within the ranges measured by much more cumbersome, complicated methods such as the controls presently in use.

SIMULATED FIELD ENVIRONMENT

| Temperature: | 27.5° centigrade, 60% relative humidity |
|---|---|
| Hydrogen sulfide concentration | 33 ppb (calculated) |

Control analysis of the concentration using the lead acetate tape sampler: Less than 3 ppb.

NOTE: At this low concentration for hydrogen sulfide and because free chlorine gas was introduced in this test, it is probable that the hydrogen sulfide reacted to form free sulfur, thereby explaining the abnormally low reading from the lead acetate tape sampler.

A parallel control test using the Meloy flame photometric total sulfur analyzer, a well-known and commercially available piece of equipment, indicated total sulfur at 70 parts per billion. This is composed of hydrogen sulfide, sulfur dioxide and free sulfur.

Concentration as measured by the hydrogen sulfide reactive substrate of the present invention: 32 to 38 parts per billion over 5 tests. Average: 36 parts per billion.

Sulfur dioxide concentration: 23 parts per billion.

Control analysis concentration of sulfur dioxide hydrogen sulfide and free sulfur using the aforementioned Meloy total sulfur analyzer: 70 parts per billion.

Concentration measured by the sulfur dioxide reagent substrate of the present invention: 14 to 53 parts per billion over 5 tests. Average: 29 parts per billion.

NOTE: the precision of the sulfur dioxide measurement can be improved greatly by closely controlling any sulfur residue left in the nickel hydroxide reagent following the preparation of the reagent filters as taught above.

In the present test it was discovered that many of the prepared filters contained residual sulfur from the preparation of the nickel hydroxide reagent on the filter substrate which would have lead to the abnormally high 53 parts per billion reading shown above. It should also be noted that the total sulfur analyzer reading of 70 parts per billion would be reading 33 parts per billion hydrogen sulfide plus 23 parts per billion sulfur dioxide plus any free sulfur produced in the environmental chamber from the hydrogen sulfide - chlorine reaction. The total sulfur present can generally be compared with the readings taken on the reagent substrates of the present invention as follows: Total sulfur analyzer reading, 70 parts per billion. In comparison, the substrate reading for sulfur dioxide which was 29 ppb, when added to the silver nitrate filter measurement of 36 ppb (which also includes a measurement of free sulfur), gives a total of 65 parts per billion. This is a close tracking with the total sulfur analyzer.

For the chlorine, a calculated concentration of 27 parts per billion was injected into the chamber. The analyzed concentration for control could not be measured because no present tests other than the one of the current invention are known which can easily and accurately measure free chlorine in a gaseous mixture with other reactive and corrosive gases. The concentration as measured by the total chloride on the initial Whatman No. 41 filter plus the amount shown from the ortho tolidine reagent substrate filter (over 5 tests) range between 19 and 41 parts per billion for an average of 30 parts per billion. This is a very close measurement to the actual concentration present.

While the foregoing two test runs, made respectively under the accelerated test condition and under the simulated field environment condition prove quite clearly the usefulness and practicality of the present invention, additional tests for calibrating the individual reagent filter substrates against known individual concentrations were conducted under carefully controlled conditions in which such contaminates as free sulfur in the environment, particulates, etc., were eliminated. These results are reported in tables below to show the close tracking between the measurements of known concentrations in isolation by the reactive substrate filters of the present invention. These tests are also an illustrative, by comparison with the above results, as an indicator of the small effects which are contributed by introducing other gaseous reactants in mixtures and by adding other pollutants, such as free sulfur, to the test. It can be clearly seen from the previous test results shown above that while some effect on the measurements occurs, the measurements are still quite closely correlated to the actual concentrations present in spite of the fact that a mixture of gases was simultaneously analyzed and measured.

CHLORINE GAS

| Actual Content of Sample | Measured Content by Present Method and Device on 0 - Tolidine Filter |
|---|---|
| 2.5μg | 3.0μg |
| 2.5μg | 1.5μg |
| 5.0μg | 5.5μg |
| 5.0μg | 4.5μg |
| 7.5μg | 9.5μg |
| 7.5μg | 6.0μg |
| 7.5μg | 7.0μg |
| 10.0μg | 9.25μg |
| 15.0μg | 15.0μg |
| 29.0μg | 33.0μg |
| 40.0μg | 43.0μg |
| 40.0μg | 38.5μg |
| 60.0μg | 66.0μg |
| 60.0μg | 57.0μg |
| 58.0μg | 63.5μg |
| 75.0μg | 70.5μg |

HYDROGEN SULFIDE GAS

| Actual Content of Sample | Measured Content by Present Method and Device on Silver Nitrate Filter |
|---|---|
| 7.0μg | 7.5μg |
| 7.0μg | 7.5μg |
| 14.0μg | 16.5μg |
| 14.0μg | 17.0μg |
| 28.0μg | 25.0μg |
| 28.0μg | 30.5μg |
| 60.0μg | 58.0μg |

SULFUR DIOXIDE GAS

| Actual Content of Sample | Measured Content by Present Method and Device on Nickel Hydroxide Filter |
|---|---|
| 7.0μg | 10.5μg |
| 13.0μg | 15.0μg |
| 26.0μg | 27.5μg |
| 30.0μg | 32.0μg |
| 9.0μg | 7.5μg |
| 38.0μg | 38.5μg |
| 42.0μg | 41.5μg |

While the invention has been particularly shown and described with reference to a preferred embodiment thereof, it will be seen by those skilled in the art that the foregoing and other changes can be made without departing from the spirit and scope of the invention.

What is claimed is:

1. A method of simultaneously measuring the quantitative presence of a plurality of gaseous atmospheric pollutants, comprising steps of:

depositing specific dry reagents individually on separate, air permeable substrates for each of said gaseous pollutants whose presence is to be measured;

sealing said substrates in an air tight package and arranged in a stack from top to bottom in an order in which no reagent substrate sensitive to more than one specific pollutant is placed higher in the stack than any substrate which carries a specific reagent for any of the pollutants to which said reagent on said higher substrate is reactive;

opening said package at a location whose degree of pollution from said plurality of gaseous pollutants is to be measured and passing a known volume of ambient atmosphere through said substrates from top to bottom;

resealing said package to prevent further reaction between the atmosphere and said reagents until the reactive products are analyzed;

opening and analyzing the reactive products present on said substrates to determine from the amount of said reactive products present the amount of each of said pollutants present in said known volume of ambient air at said measured location.

2. The method as described in claim 1, wherein:

said depositing step is carried out under conditions in which the ambient amount of each of said pollutants is known;

said opening and analyzing of said substrates is conducted under conditions where the ambient amount of each of said pollutants to be measured is known; and said dry reagents deposited in said depositing step are deposited in an excess amount over that expected to be required for the general range of concentrations of said pollutants to be measured.

3. Apparatus for simultaneously measuring the quantitative presence of a plurality of gaseous atmospheric pollutants, comprising a plurality of specific dry reagent materials individually deposited on separate air permeable carrying means;

holding means for holding said plurality of carrier means, said holding means being a sealable airtight package for maintaining said carriers in position in an ordered stack from top to bottom, in which said order is arranged so that each said reagent which is reactive with more than one said pollutant is placed lower in the stack than any other said reagent which is reactive with fewer of said same pollutants.

4. Apparatus as described in claim 3, further comprising:

a particle entrapping filter means for entrapping any suspended particles, said filter means being placed on the top of said stack in said array in said holding means.

* * * * *